United States Patent [19]

Perrut

[11] Patent Number: 4,724,087
[45] Date of Patent: Feb. 9, 1988

[54] DEVICE FOR CARRYING OUT EXTRACTION-SEPARATION-CRACKING PROCESSES BY SUPERCRITICAL FLUIDS

[75] Inventor: Michel Perrut, St. Nicolas de Port, France

[73] Assignee: Societe Nationale Elf Aquitaine, Courbevoie, France

[21] Appl. No.: 881,106

[22] Filed: Jul. 2, 1986

[30] Foreign Application Priority Data

Jul. 9, 1985 [FR] France ................. 85 10468

[51] Int. Cl.⁴ ........................................... B01D 17/038
[52] U.S. Cl. ................................. 210/788; 209/144; 209/211; 210/512.1

[58] Field of Search ............... 210/512.1, 787, 788, 210/304; 209/144, 211

[56] References Cited

U.S. PATENT DOCUMENTS 4,594,164 6/1986 Titmas ....................... 210/512.1

Primary Examiner—Frank Sever
Attorney, Agent, or Firm—Burgess, Ryan & Wayne

[57] ABSTRACT

Separation/extraction/cracking method using a supercritical fluid in which the density of the fluid is reduced in a needle valve and directly brought into an assembly formed by a cyclonic chamber and a recovery pot and of which the walls are heated.

15 Claims, 11 Drawing Figures

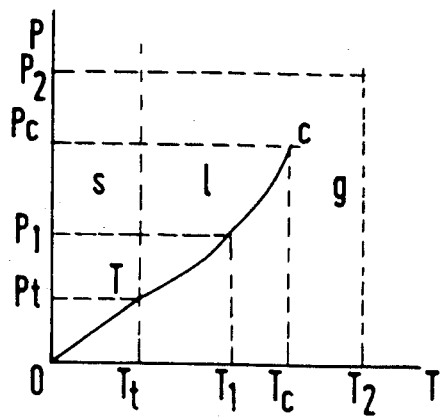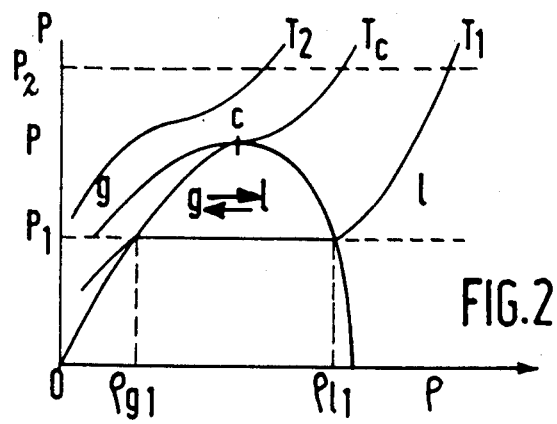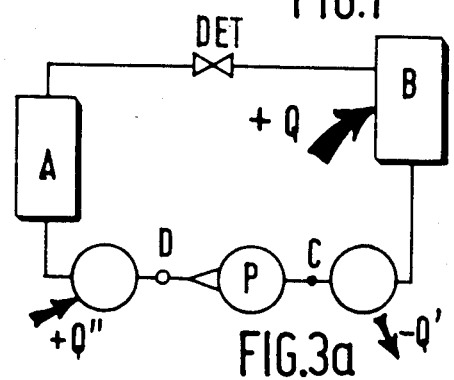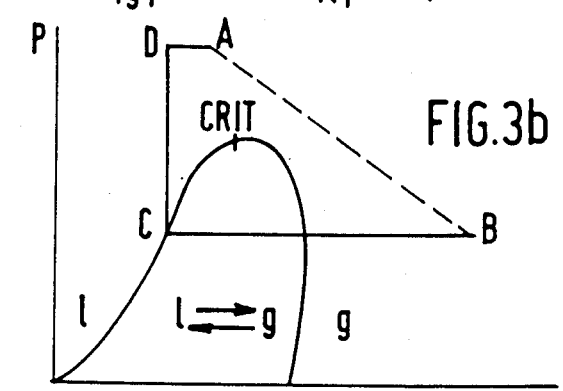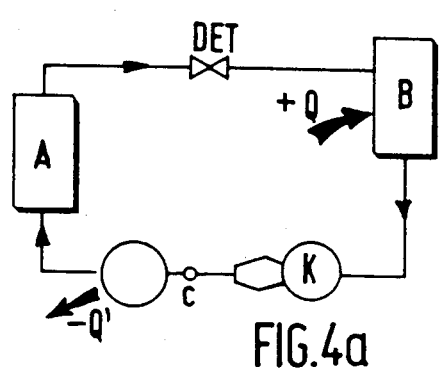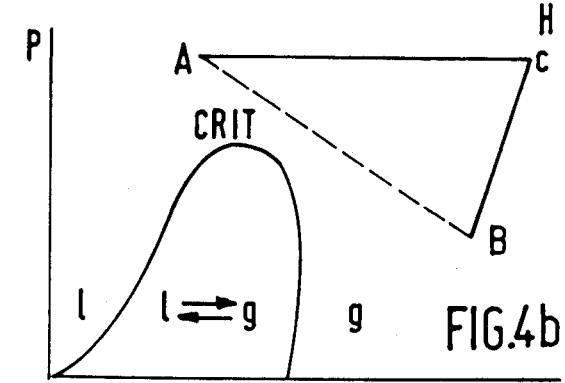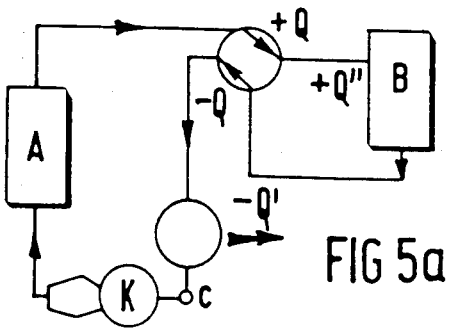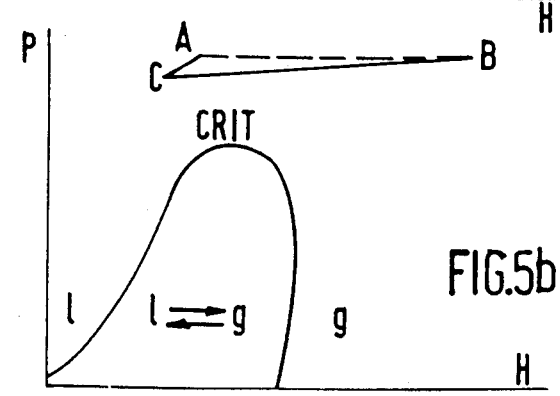

DEVICE FOR CARRYING OUT EXTRACTION-SEPARATION-CRACKING PROCESSES BY SUPERCRITICAL FLUIDS

BACKGROUND OF THE INVENTION

Field of the Invention

The present invention concerns a novel device intended to improve conditions for carrying out extraction and/or separation and/or cracking processes by means of supercritical fluids. It should first of all be recalled that when a pure fluid or a mixture is subject to conditions beyond the critical point C, a change of state exists between the gaseous phase (or vapour) and the liquid phase encountered during both liquefaction and evaporation/boiling. Once this critical point C has been exceeded, this state change disappears in order to allow to exist a single phase supercritical fluid but characterized among others by wide variations of volumic mass $\rho$. If reference is made to the diagrams of FIGS. 1 and 2 illustrating the various states of the state changes as a function (FIG. 1) of the temperature T and the pressure P and (FIG. 2) of the density $\rho$ and of the pressure p, it can be seen (FIG. 1) that if a pressure $p_1$ prevails comprised between the critical pressure $P_c$ and the pressure $P_t$ at the triple point T, when the temperature is increased, there is a change from the liquid phase l to the gaseous phase g. If a pressure $P_2$ prevails higher than the critical pressure $P_c$, there is no state change by increasing the temperature but the field of the supercritical fluid subsists (here will be mentioned simply the solid phase which does not concern the present invention).

FIG. 2 illustrates that it is possible to cross successively at pressures $P_1$ (sub-critical) and $P_2$ (supercritical) of the isotherm curves: $T_c$ corresponding to the critical temperature, $T_1$ at a sub-critical temperature and $T_2$ at a supercritical temperature. At a given pressure, it can be seen that for sub-critical $P_1$, a sudden and great change of density $\rho$ is encountered when there is a change from the gas g to the liquid l (or vice versa) with a temperature plateau and discontinuity in the variation of volumic mass of each phase ($Pg_1$, $Pl_1$) to the state change whereas for the supercritical pressure $P_2$ no further change is encountered and the corresponding sudden variation of density, but great and continuous variations of density $\rho$ as a function of temperature.

The extraction-separation-cracking processes by supercritical fluids are based on the fact that these fluids present outstanding properties with respect to liquids, especially a lower viscosity and a greater diffusivity: they present a further interesting property, namely the characteristics of their solvent power; therefore, when there is a change from the subcritical gaseous state to the supercritical fluid state, not only very high variations of density are encountered as explained hereinabove, but there is also a considerable increase in the solubility of the third body; furthermore, contrary to the liquid-liquid or liquid-solid extraction, the final solvent-extract separation does not constitute a difficult and expensive step, for example, such as re-extraction with a second solvent or distillation, but can be easily carried out by simple isotherm expansion or close to isothermicity or by heating at constant pressure or by combination of these two previous methods, the sudden variation of the solvent power and the demixtion of the extract being obtained by a sharp decrease in the volumic mass.

Certain of these properties of the supercritical fluids have been utilized in the prior art with a view to use in separation, extraction and cracking and in particular chromatographic processes (cf. French patent application filed under No. 82 09649 dated June 3, 1982).

To be more specific, three embodiments featured in FIGS. 3 to 5, will be given by way of example, the figures having the index "a" representing the flow diagram, the figures having the index "b" representing on the enthalpic diagram the corresponding cycles. On FIGS. 3a to 5a, the points or equipment designated by the same letters on the enthalpic diagrams 3b to 5b have been designated by captital letters. On these same diagrams, the separation step is represented in a dotted line on the cycle. On FIGS. 3 and 4, this solvent-extract separation is carried out by pressure drop and heat contribution in order to prevent cooling due to expansion, but the recycling of the solvent differs. On FIG. 3, a pump P is used to raise the pressure of the condensed sub-critical liquid and to bring it to the supercritical fluid state. On FIG. 4, a compressor K is used to bring the sub-critical gas to the supercritical state then an exchanger Q' to cool the fluid to the desired temperature.

On FIG. 5, the solvent-extract separation is carried out by temperature rise, the recycling of the solvent being carried out by means of a compressor K working at a low rate of compression in established state.

To be more explicit, the three following cases will now be considered separately:

FIG. 3

A supercritical state
AB separation state: expansion in the DET expander and heat contribution +Q in order to arrive at B at the sub-critical gaseous state;
BC the condensation step: through loss of heat $-Q'$, the gas is condensed into liquid at sub-critical constant pressure;
CD recompression step; due to the pump P for raising up to the supercritical pressure;
DA reheating step: by contribution $+Q''$ for a return to departure point A of the cycle.

FIG. 4

A supercritical state
AB separation state: expansion in the DE expander in order to arrive with heat contribution +Q in sub-critical gaseous phase;
BC recompression step; due to the compressor K return to the supercritical initial pressure;
CA cooling step: to return to the initial point of the cycle due to $-Q'$.

FIG. 5

A supercritical state
AB separation state: due to the heating +Q by thermal exchange and $+Q''$ by direct contribution;
BC cooling step: due to the exchanger $-Q$ with the fluid in separation being reheated and at $-Q'$;
CA recompression step: in the compressor K with a slight corresponding reheating.

Despite the technical limitations and the high costs associated to the use of high pressures, the supercritical extraction presents among others the following advantages:
- substantial energy savings can be realized with respect to classical extraction processes such as explained herein-above;
- due to the fact that the temperatures involved are relatively low, there is no reason to fear degradation of the heat-sensitive components;
- the cracking of the extract itself can be carried out by expansion in several steps in several recovery recipients;
- the use of a non-toxic supercritical solvent such as $CO_2$ is perfectly adapted to the separation or the extraction of the products for the foodstuffs, pharmaceutical, perfumery or cosmetic industry and more generally for any industry requiring the elimination of products that are harmful to man or to the environment;
- the most current solvents (light hydrocarbons, $CO_2$, $N_2O$, especially) have relatively low cost prices.

In the solvent-extract separation techniques that, as was explained herein-below can be carried out during a single step, the density of the solvent, has been considerably reduced which provokes a sharp variation of its solvent power so that the extract is separated from the solvent which has become a sub-critical gas or a supercritical fluid of low density.

However although the principle is extremely simple, its application raises a problem. In fact, a quasi-adiabatic and non isotherm expansion of the solvent is carried out in the expansion member, which provokes the formation of a mist consisting on the one hand of a phase constituted by the expanded solvent in the sub-critical gas state or the supercritical fluid of low density and, on the other hand, a liquid phase constituted by droplets of solvent containing the greatest part of the extract of which the solubility in the first phase of low density is low.

From then on, it is important to collect the droplets and to evaporate the solvent, without which considerable carrying along of the extract by the low density phase (sub-critical gas or supercritical fluid) is observed and the trapping yield is mediocre. This poor result is currently observed upon a number of supercritical extractors of the prior art which are relatively inefficient in order to reach acceptable yields whereupon it is necessary to extract the substances requiring a high solvent rate such as vegetal aromas, for example.

OBJECTS AND SUMMARY OF THE INVENTION

The object of the present invention is therefore:
- to ensure the expansion of the extraction medium;
- to bring the enthalpy necessary to render this expansion quasi-isotherm;
- to recover the extract with a high yield.

To do this, the devices featured in the present invention utilize:
- a valve performing the said expansion;
- immediately downstream from this valve, a device for separating the droplets, recovering them along the length of the walls where they flow in order to be collected in a heated collector recipient, as well as the said walls by a heat-conveying fluid.

According to one preferred characteristic of the invention, the collecting system is of the cyclone type in which is admitted the mist by a tubular pipe issuing into the body of the cyclone at a high angular speed.

In order to render more apparent the technical objects, features and advantages of the present invention, embodiments will be described, with it being well understood that these are not limitative as to the manner in which they are carried out not to the applications which can be made thereof.

BRIEF DESCRIPTION OF THE DRAWINGS

FIG. 1 is a graphic diagram of pressure versus temperature, illustrating state changes between a gas and liquid phase;

FIG. 2 is a graphic diagram of pressure versus density, illustrating state changes between a gas and liquid phase;

FIG. 3a is a flow diagram, illustrating solvent-extract separation;

FIG. 3b is an enthalpic diagram corresponding to the flow diagram of FIG. 3a;

FIG. 4a is a flow diagram, illustrating another solvent-extract separation;

FIG. 4b is an enthalpic diagram corresponding to the flow diagram of FIG. 4a;

FIG. 5a is a flow diagram, illustrating still another solvent-extract separation;

FIG. 5b is an enthalpic diagram corresponding to the flow diagram of FIG. 5a;

Figure 6:
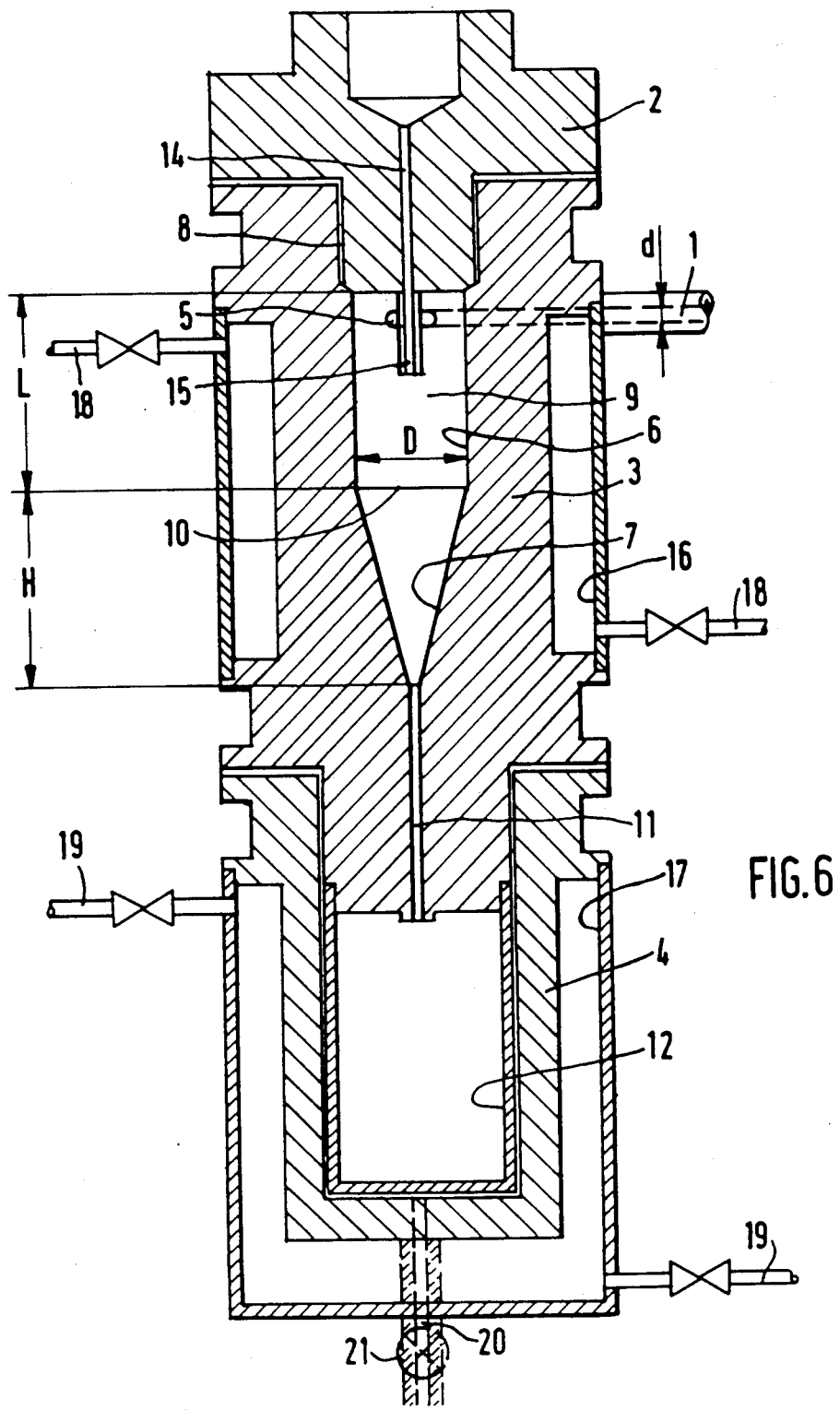
Figure 7:
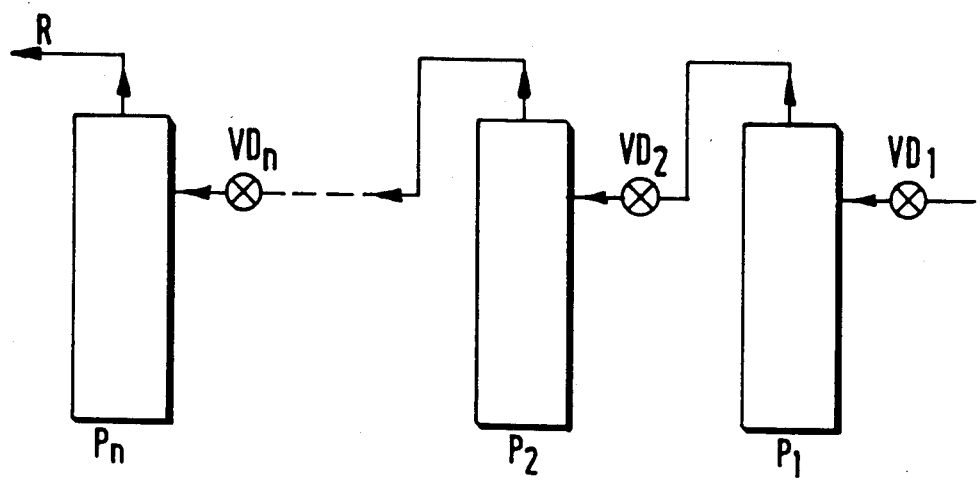
Figure 8:
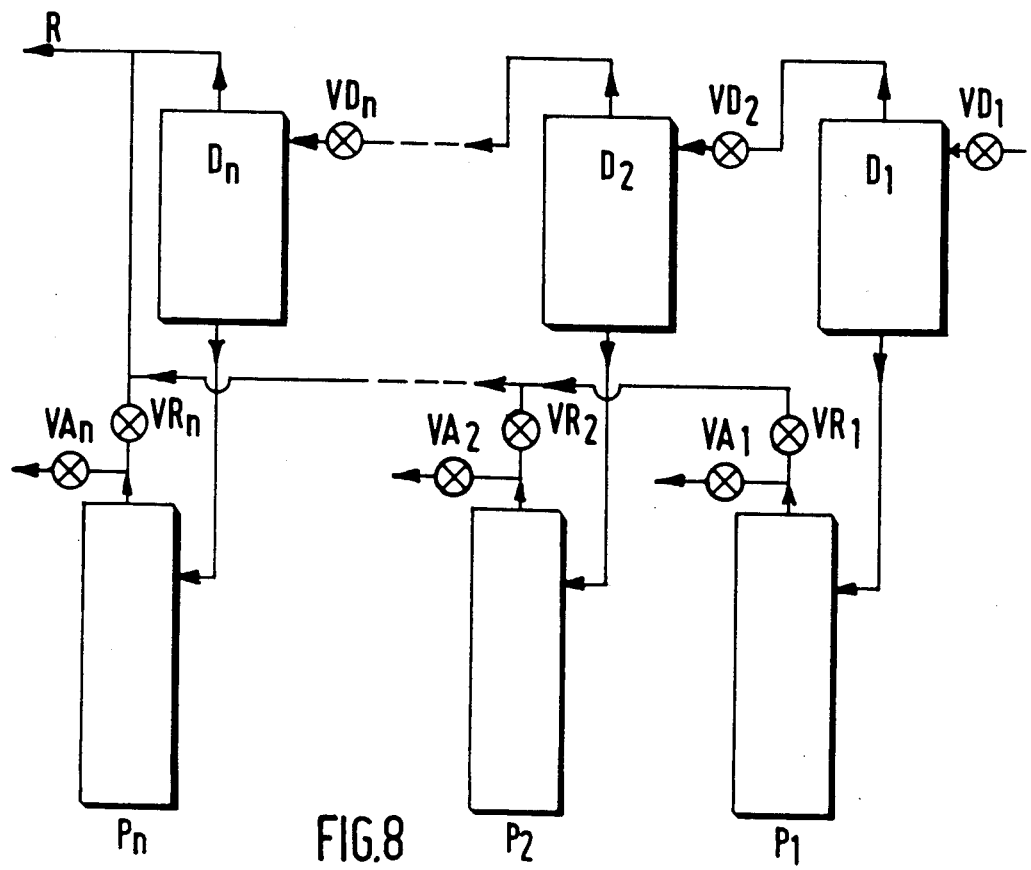

In addition, FIGS. 1 to 5 described herein-below, reference will be made to the following figures that represent schematically:

FIG. 6: in axial cross-section, an extraction/separation device according to the present invention;

FIG. 7: an assembly of such devices mounted in series according to a variant of the invention;

FIG. 8: another assembly of such devices mounted in series according to another variant.

DESCRIPTION OF THE PREFERRED EMBODIMENTS

On FIG. 6, the inlet valve is not shown can be any conventional valve adapted to ensure a quasi-adiabatic expansion such as, in particular, a needle valve which can be advantageously heated in order to facilitate its working.

This valve is directly connected onto the inlet pipe 1 of the extraction medium of an internal diameter d.

The equipment of FIG. 6 essentially comprises three removable parts, a head 2 for extracting the solvent with a view to recycling it, the body 3 per se of the separation/extractor and the recovery receiver 4. These various elements are assembled by any known or conventional means (screwing, mainly sealing rings) not shown for enhanced simplicity.

The inlet pipe 1 penetrates the body 3 and issues tangentially in 5 in an axial cylindrical bore 6 terminated downwards by a conical part 7 and issued upwards by the cylindrical protruding part 8 of the head 2 being adjusted in the bore 6. The chamber 9 thus formed acts as a cyclone. Its cylindrical part of diameter D has a length L going from the base of the stopper 8 to the section of the connection 10 between the cylindrical bore 6 and the conical part 7. At the base of this latter, of height H and thus of diameter D at this upper section, is perforated an axial evacuation channel 11 towards the pot 12 disposed in the receiver 4. The head 2 and its lower extension forming stopper 8 are axially perforated by an axial evacuation channel 14 extended in 15 towards the inside of the chamber 9. The body 3 and the pot 4 present a jacket or double casing (respectively 16 and 17) for the circulation of a heat-transfer fluid, which allows to confer upon the cylindrical and conical walls of the chamber 9 and to the pot 12 recovery an adequate temperature for recovering the droplets, such as will be seen herein-below.

Immediately, at the outlet of the expander valve (not shown), the solvent fluid containing the extract penetrates by the linear speed v and provokes the rotation of the fluid mass contained in the cyclonic chamber 9. The droplets then separate, and due to the centrifugal force, flow along the length of the walls so as to be recovered by passing through the channel 11 in the pot 12.

The expanded fluid freed from the droplets issues by the upper central channel 15—15 towards the recycling channel (not shown).

In one variant of the device of FIG. 6, it is possible to empty the recovery pot 12, a duct 20 equipped with a stock cock 21 allowing drawing off of the collected substances (in dotted lines on FIG. 6).

If Qm designates the mass flow-rate entering into the device of FIG. 6 after expansion, it is possible to calculate, due to a state equation such as the Peng-Robinson equation, the density $\rho$, from which the volume flow-rate $Q_v = Qm/\rho$.

Experience has shown that good results are obtained for $\rho V^2 < 2,000$ kgm$^{-1}$.sec$^{-2}$, it is possible to define d so that $$V = \frac{4 Q_v}{\pi d^2}$$

or comprise between 2 and 30 m/sec, and preferably between 2 and 10 m/sec.

With respect to the diameter D of the cyclonic chamber 9, experience has shown that the best results are obtained for D=kd with $2.5 \leq k \leq 4$. These experiments have also shown that the best results are obtained with $1.5D \leq L \leq 5D$ and $1.5 \leq H \leq 5D$, which allows to define the optimal dimensions of the cyclonic chamber 9.

More specifically, it is possible to give the following example.

A mass flow-rate Qm=8 kg/h of $CO_2$ loaded with a small content of extract (lower than 1% by weight, for example) expanded to 60 bars and maintained at 35° C. bars in the device described herein-below. The critical pressure of the $CO_2$ is 73 bars, its critical temperature 31.3° C. The expansion to 60 bars was obtained in the expander upstream from the device (not represented) thus passing from a supercritical fluid to supercritical gas.

In this case, use may be of a device in which the diameter d of the inlet channel is 2.5 mm, the diameter D of the cyclonic chamber is 10 mm, the length L of its cylindrical part 20 mm and the height H of its conical part 15 mm. This device can be produced in stainless steel with polytetrafluoroethylene joints (PTFE) between the three main pieces (2, 3, and 4 of FIG. 6), thereby allowing to withstand for example pressures of about 200 bars, at temperatures close to ambient temperature (from 0° to 80° C., for example) by selecting adequate thicknesses calculated by conventional means in the field of the strength of materials.

The heat transfer fluid brings by the jackets or double casings 16 and 17, the enthalpy necessary to ensure temperatures more convenient for the flow towards pot 12 of the centrifuged droplets. It is therefore preferable to provide connections with automatic sealings 18 and 19 schematically represented on FIG. 6 in order to be able to dismantle the receiver 4 and extract the pot 12 without having to empty the whole of the device of its heat-conveying fluid.

According to a first variant, it is possible to utilize (FIG. 7) several successive devices such as those of FIG. 6 mounted in series, and designated $P_1 P_2 \ldots P_n$. Each device is equipped with its expansion valve $VD_1$, $VD_2, \ldots VD_n$, the solvent outlet of each device being switched to the inlet of the expansion valve of the following device. At each step thus constituted, are received in the recovery pot (or in the corresponding channel), the fractions thus separated and the solvent is sent to the next step for a fresh separation at lower pressure obtained through an expansion valve VD. Thereby, step by step, the solvent/extract separation is perfected.

It is even possible to envisage carrying out a certain stripping of the extract, the composition of the fractions of the extract depending upon the operating pressure.

According to another variant, it is possible to use one or several devices (FIG. 8) according to the invention, possibly disposed in series according to a configuration equivalent to that of FIG. 7, not which the aim of performing a staged expansion on the main solvent+extract stream, but to facilitate recovery at atmospheric pressure, these products having precipitated in one or several expansion pots conventionally used in installations using the supercritical fluids.

FIG. 8 illustrates a series of expansion pots $D_1, D_2 \ldots D_n$, which are preceded by their expansion valves $VD_1, VD_2 \ldots VD_n$, each solvent outlet of each expansion pot being connected to the inlet of the expansion valve of the following stage. A progressive step-by-step expansion is thus obtained. These extracts recovered in the lower part of of each pot are generated dissolved in a solvent in the liquid state or contain large quantities of this solvent, they are sent to the inlets of the devices $P_1$, $P_2 \ldots P_n$ according to the invention that are thus going to fractionate the extracts issuing from the expansion pots $D_1, D_2 \ldots D_n$.

The upper outlet can either be connected to the atmosphere ($VA_1, VA_2 \ldots VA_n$) or if the solvent can still be recovered, connected to the recovery R via $VR_1$, $VR_2 \ldots VR_n$. It will be noted that if, on FIG. 7 a device P has been provided according to the invention for each expansion pot D, it is possible to provide several devices mounted in series and at successive depressions as in FIG. 7 in order to process the extract from a expansion pot $D_1, D_2 \ldots D_n$.

This variant according to the invention is very interesting since in a large number of installations of the conventional type, the recovery yields of the extracts are poor and only slightly reproducible during the putting to the atmosphere of the expansion pots for the recovery of the extract. Furthermore, and still with reference to the same case, the losses in solvent gas are also very high. On the other hand, through using, as in FIG. 8, devices according to the invention (and possibly utilization in series) yields that are both higher and more reproductible are obtained.

APPLICATION EXAMPLE

In an installation comprising an extractor 6 liter capacity autoclave and two expansion autoclaves, a charge of red wine is used and a solvent fluid $CO_2$.

Extraction is performed at 150 bars, at 40° C., with 1 liter of $CO_2$ per liter of wine processed.

In expansion, in the first autoclave the pressure is reduced to 70 bars at a temperature of 50° C. and in the second the pressure is reduced to 40 bars, while maintaining the temperature at 50° C. The extracts of the expansion pots are recovered after extraction, through expansion at atmosphere.

If expansion is performed directly at the atmosphere through devices according to the invention (FIG. 8) the quantities respectively collected after passage in the devices according to the invention are of 30 cm$^3$ and 1 cm$^3$ with a reproducibility at ±10% for the first autoclave and ±30% for the second autoclave.

I claim:

1. The method comprising: separating dissolved material from a supercritical fluid containing the material by, providing a device, including, a pressure reduction means for reducing the pressure of the supercritical fluid having a first density to form a reduced pressure fluid having a second density which is lower than the first density, and containing a second phase comprising the material; a cyclone separating zone means tangentially connected with the pressure reduction means for separating the second phase from the reduced pressure fluid to form a treated reduced pressure fluid; first means for withdrawing the treated reduced pressure fluid from the cyclone separating zone means; and second means for withdrawing the second phase comprising the material from the cyclone separating zone means feeding said supercritical fluid into said device, and withdrawing said treated reduced pressure fluid and said second phase form said device.

2. The method of claim 1 wherein the pressure reduction means comprises an isothermal pressure reduction means.

3. The method of claim 1 wherein the pressure reduction means is an expander.

4. The method of claim 3 wherein the valve further comprises means to heat the valve.

5. The method of claim 1 wherein the pressure reduction means is a valve.

6. The method of claim 5 wherein the valve is a needle valve.

7. The method of claim 5 wherein the needle valve is heated.

8. The method of claim 1 wherein the cyclone separating zone means comprises a cylindrical separating zone with a tangential inlet for the reduced pressure fluid containing the second phase, one end of said cylindrical separating zone having an axial channel for withdrawal of the reduced pressure from the cyclone and means for collecting the separated second phase in communication with the axial channel for withdrawing the separated second phase.

9. The method of claim 8 which further comprises means for heating the cylindrical separating zone of the cyclone.

10. The method of claim 9 which further comprises means for heating the conical portion of the cyclone.

11. The method of claim 8 which further comprises means for heating the collecting means.

12. The method of claim 1 wherein the pressure reduction means is connected to the cyclone separating zone means through a channel having a cross-sectional area sufficient to introduce the reduced pressure fluid into the cyclone separating zone means at a velocity of from 2 to 10 meters/sec.

13. The method of claim 1 wherein the cyclone separating zone means comprises a cylindrical section wherein the length of the cylindrical section is from 1.5 to 2 times the diameter of the cylindrical section.

14. The method of claim 13 which further comprises a conical section with a height 1.5 to 2 times the diameter of the cylindrical section.

15. The method for separating material from a supercritical fluid which comprises at least two devices of claim 1 connected in series wherein the pressure reduction means of a downstream device is connected to an upstream device through the means for withdrawing the treated reduced pressure fluid from the cyclone separating means.

* * * * *